United States Patent
Santini et al.

(10) Patent No.: US 9,657,694 B2
(45) Date of Patent: May 23, 2017

(54) INLET AIR FILTER DEVICE FOR A POWER PLANT

(71) Applicant: Nuovo Pignone Srl, Florence (IT)

(72) Inventors: Marco Santini, Florence (IT); Marc Malivernay, Belfort (FR); Giorgio Marchetti, Falconara (IT); Ludovic Pesenti, Echirolles (FR); Philippe Claudon, Etueffont (FR)

(73) Assignee: Nuovo Pignone Srl, Florence (IT)

( * ) Notice: Subject to any disclaimer, the term of this patent is extended or adjusted under 35 U.S.C. 154(b) by 36 days.

(21) Appl. No.: 14/380,105

(22) PCT Filed: Feb. 20, 2013

(86) PCT No.: PCT/EP2013/053318
§ 371 (c)(1),
(2) Date: Aug. 21, 2014

(87) PCT Pub. No.: WO2013/124285
PCT Pub. Date: Aug. 29, 2013

(65) Prior Publication Data
US 2015/0033681 A1 Feb. 5, 2015

(30) Foreign Application Priority Data

Feb. 21, 2012 (IT) ............... CO2012A0007

(51) Int. Cl.
*F02M 35/022* (2006.01)
*B01D 46/00* (2006.01)
(Continued)

(52) U.S. Cl.
CPC ..... *F02M 35/0226* (2013.01); *B01D 46/0087* (2013.01); *B01D 46/10* (2013.01);
(Continued)

(58) Field of Classification Search
CPC ........... F02K 3/04; B01D 40/00; B01D 46/46; B01D 46/42; B01D 46/008; B01D 46/0095; B01D 53/04; B01D 46/44; B23P 17/00
(Continued)

(56) References Cited

U.S. PATENT DOCUMENTS

| | | |
|---|---|---|
| 1,914,667 A | 6/1933 | Kolla |
| 3,756,416 A | 9/1973 | Wood |

(Continued)

FOREIGN PATENT DOCUMENTS

| | | |
|---|---|---|
| CN | 1193889 A | 9/1998 |
| GB | 2474351 A | 4/2011 |

(Continued)

OTHER PUBLICATIONS

Unofficial English translation of Office Action issued in connection with corresponding CN Application No. 201380010395.7 on May 4, 2015.

(Continued)

*Primary Examiner* — Duane Smith
*Assistant Examiner* — Minh-Chau Pham
(74) *Attorney, Agent, or Firm* — GE Global Patent Operation

(57) ABSTRACT

An inlet air filter device including: at least one passage for delivering an air mass from an inlet section to an outlet section of the inlet air filter device, a water separator in the at least one passage for separating water in the air mass, the water separator positioned between the inlet section and the outlet section, a bypass element movable between a first open position in which the air mass is forced to cross the water separator and a second closed position in which the air mass flows from the inlet to the outlet section without crossing the water separator; a shutter element which is (Continued)

actuatable to co-operate with the bypass element for isolating the water separator from the air mass when the bypass element is in the second closed position.

20 Claims, 7 Drawing Sheets

(51) Int. Cl.
  *B01D 46/10* (2006.01)
  *B01D 46/42* (2006.01)
  *B01D 46/44* (2006.01)
  *F02M 35/08* (2006.01)
(52) U.S. Cl.
  CPC ............ *B01D 46/42* (2013.01); *B01D 46/44* (2013.01); *F02M 35/082* (2013.01); *B01D 2275/10* (2013.01); *B01D 2279/60* (2013.01); *Y10T 29/49826* (2015.01)
(58) Field of Classification Search
  USPC ........... 55/341.1, 309, 312; 95/286; 96/421, 96/420, 134; 29/888; 60/264
  See application file for complete search history.

(56) References Cited

U.S. PATENT DOCUMENTS

| | | | | |
|---|---|---|---|---|
| 3,951,625 | A * | 4/1976 | Follette | F24F 3/14 236/44 C |
| 4,297,113 | A * | 10/1981 | Theodore | B01D 46/0095 55/341.1 |
| 4,698,078 | A | 10/1987 | Mavros | |
| 4,854,950 | A | 8/1989 | Kierzkowski et al. | |
| 5,064,453 | A * | 11/1991 | Jacquish | B01D 53/0446 55/312 |
| 5,090,194 | A * | 2/1992 | Richards | F01D 17/26 137/625.23 |
| 5,127,927 | A | 7/1992 | Holmes et al. | |
| 5,279,358 | A * | 1/1994 | Hannis | F01D 17/105 137/862 |
| 5,297,173 | A * | 3/1994 | Hikmet | H04L 7/033 331/11 |
| 6,123,751 | A * | 9/2000 | Nelson | B01D 46/002 55/302 |
| 6,682,897 | B1 | 1/2004 | Cohen et al. | |
| 6,875,256 | B2 * | 4/2005 | Gillingham | B01D 39/1623 55/302 |
| 7,007,484 | B2 * | 3/2006 | Stegmaier | F01D 15/005 60/728 |
| 7,297,173 | B2 * | 11/2007 | Renwart | B01D 46/0068 220/745 |
| 7,966,802 | B2 * | 6/2011 | Szepek | H04B 17/345 60/39.281 |
| 2007/0294984 | A1 * | 12/2007 | Chillar | F02C 7/04 55/314 |
| 2008/0141636 | A1 | 6/2008 | Singh | |
| 2011/0083419 | A1 * | 4/2011 | Upadhyay | B01D 46/42 60/264 |
| 2011/0277441 | A1 * | 11/2011 | Ayshford | B01D 46/0086 60/39.092 |
| 2014/0251129 | A1 * | 9/2014 | Upadhyay | B01D 46/003 95/19 |
| 2015/0114229 | A1 * | 4/2015 | Rout | B01D 46/008 95/286 |

FOREIGN PATENT DOCUMENTS

| | | |
|---|---|---|
| JP | 45024693 B | 8/1970 |
| JP | 61200420 U | 12/1986 |
| JP | 63209720 A | 8/1988 |
| JP | 63287532 A | 11/1988 |
| JP | 06134234 A | 5/1994 |
| JP | 2000262826 A | 9/2000 |
| JP | 2003103127 A | 4/2003 |
| JP | 2003207186 A | 7/2003 |
| JP | 2004150766 A | 5/2004 |
| JP | 2004301423 A | 10/2004 |
| JP | 2006043568 A | 2/2006 |
| JP | 2006130466 A | 5/2006 |
| JP | 2008151130 A | 7/2008 |
| WO | 8701959 A1 | 4/1987 |

OTHER PUBLICATIONS

Italian Search Report and Written Opinion dated Dec. 3, 2012 which was issued in connection with Italian Patent Application No. CO2012A000007 which was filed on Feb. 21, 2012.

International Search Report and Written Opinion dated Aug. 4, 2013 which was issued in connection with International Patent Application No. PCT/EP2013/053318 which was filed on Feb. 20, 2013.

Unofficial English Translation of Japanese Office Action issued in connection with corresponding JP Application No. 2014-557078 on Nov. 22, 2016.

Unofficial English Translation of Japanese Search Report issued in connection with corresponding JP Application No. 2014-557078 on Dec. 26, 2016.

* cited by examiner

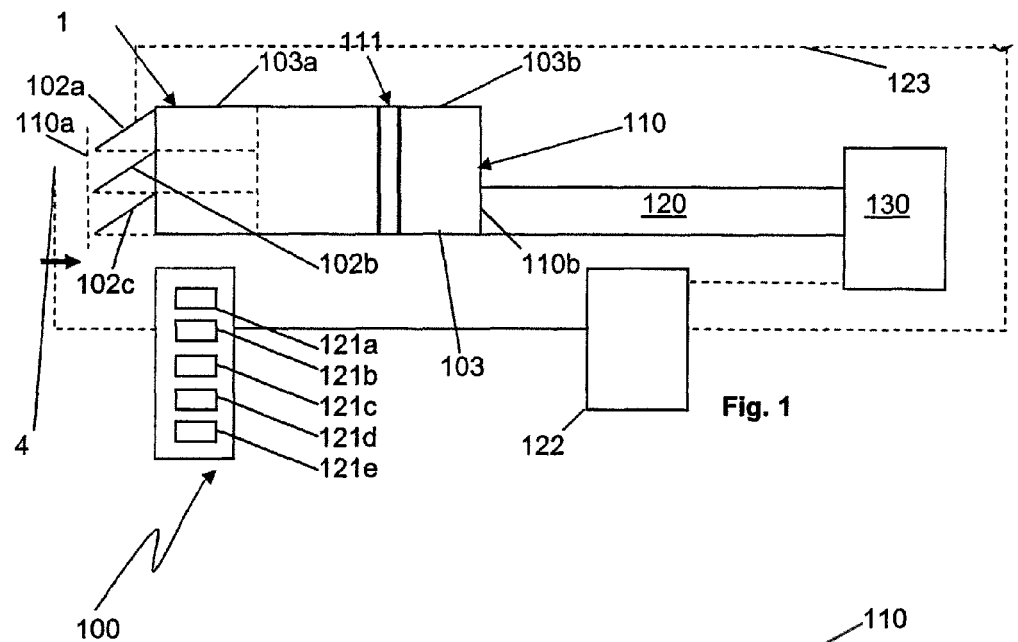
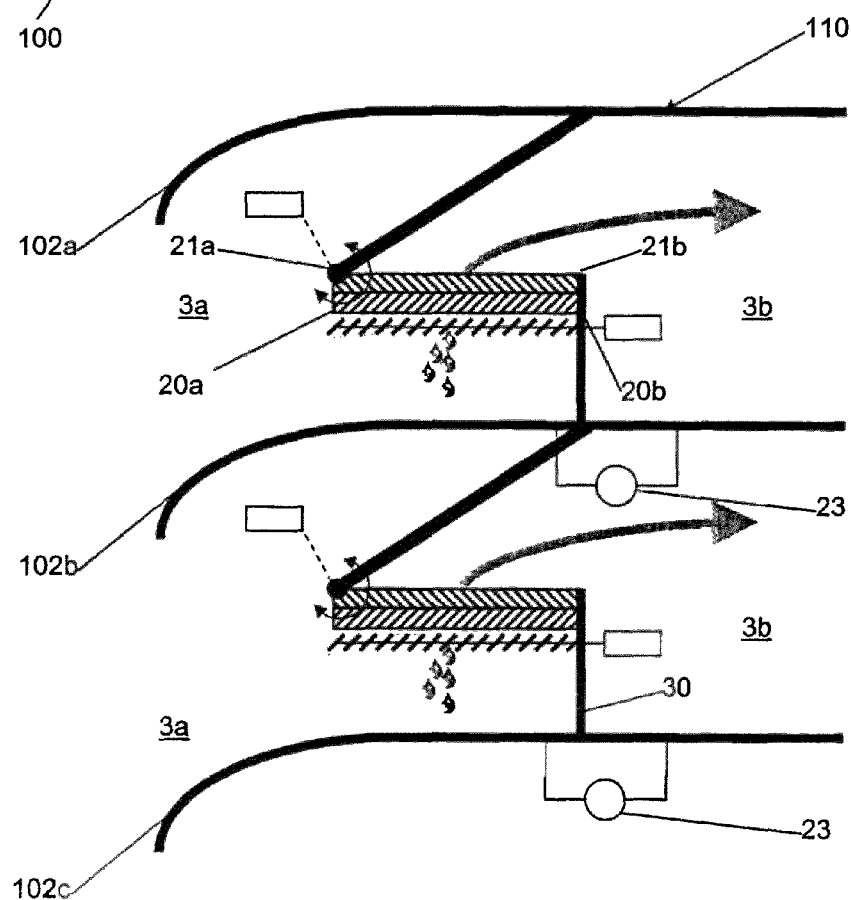

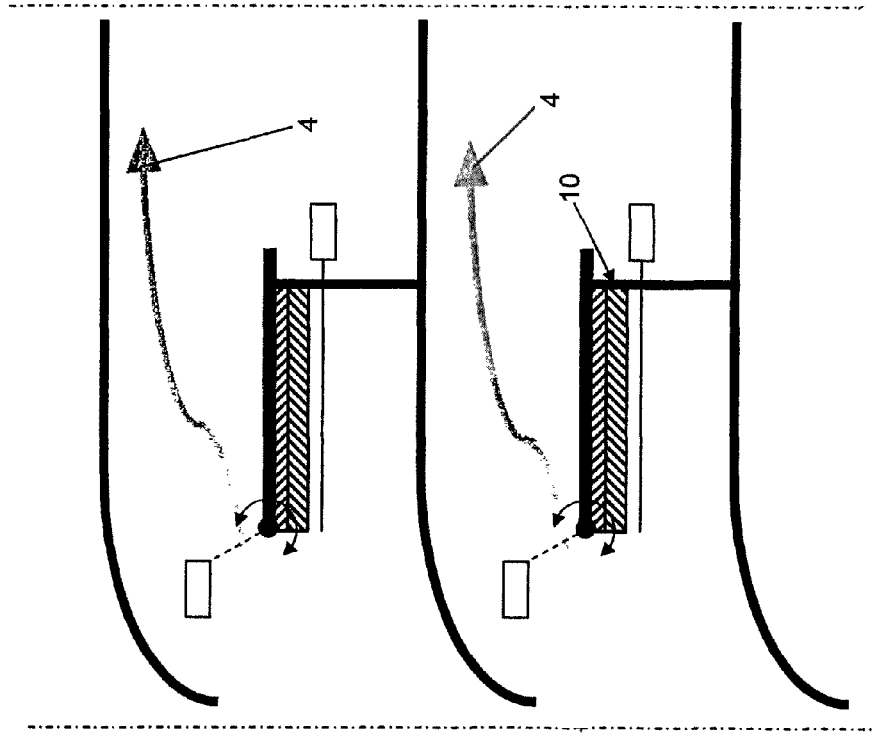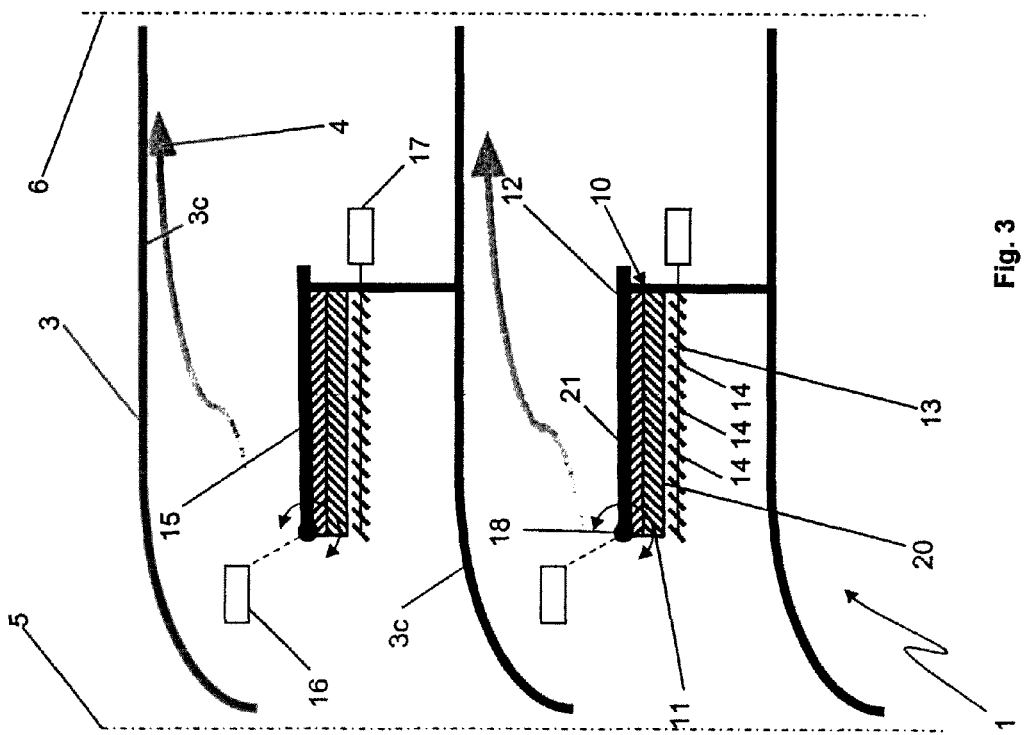

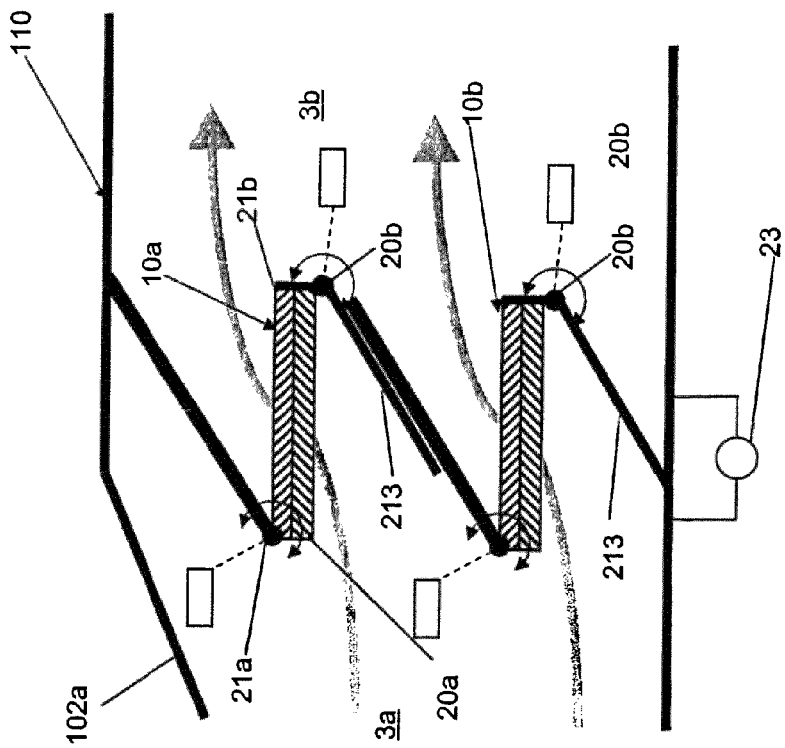
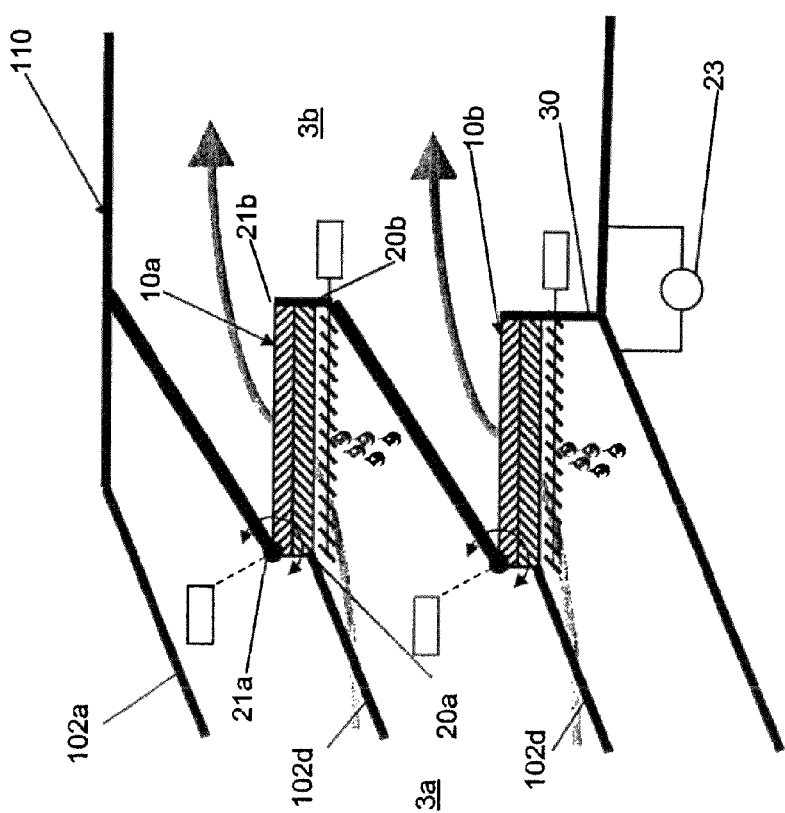

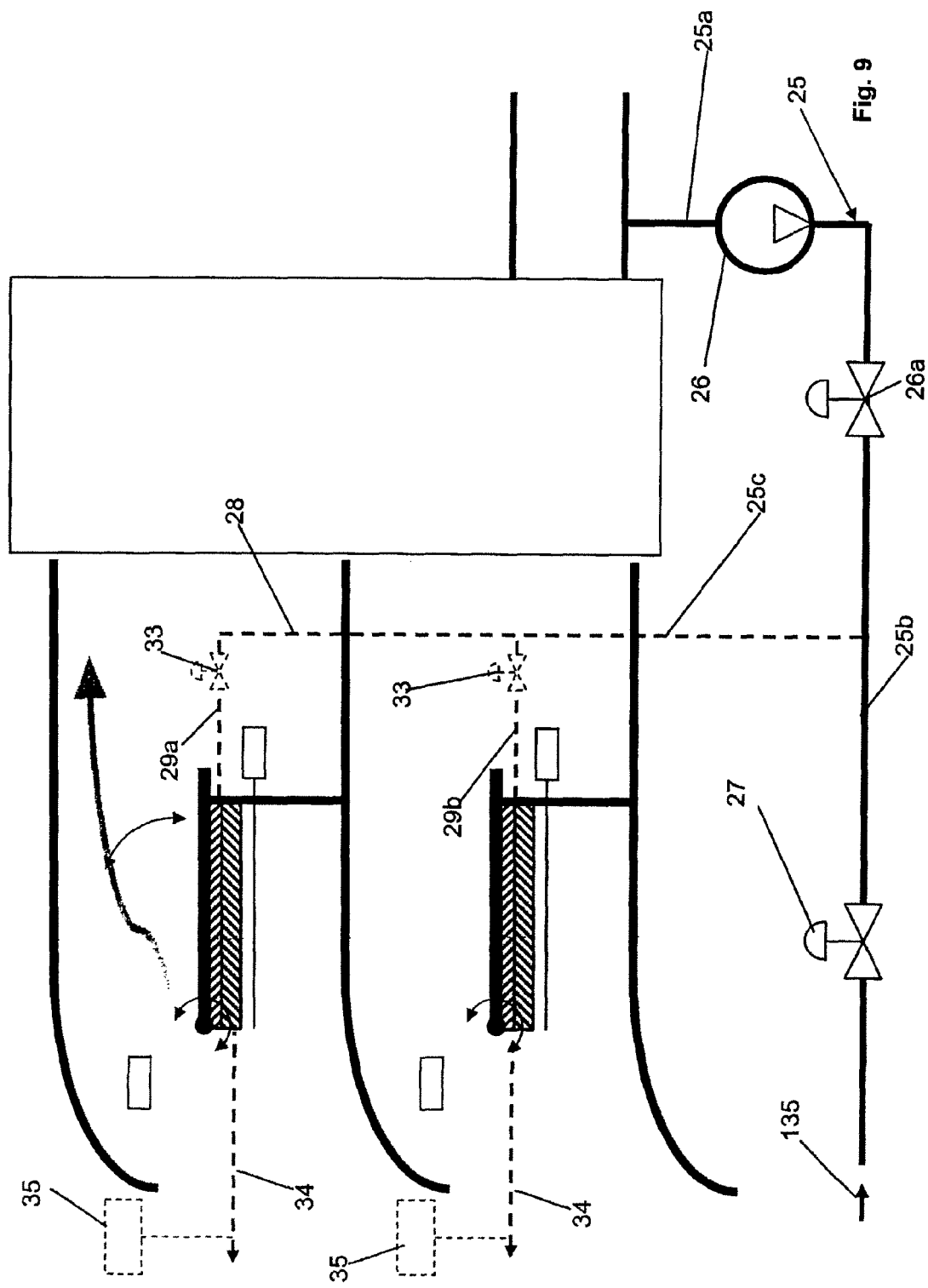

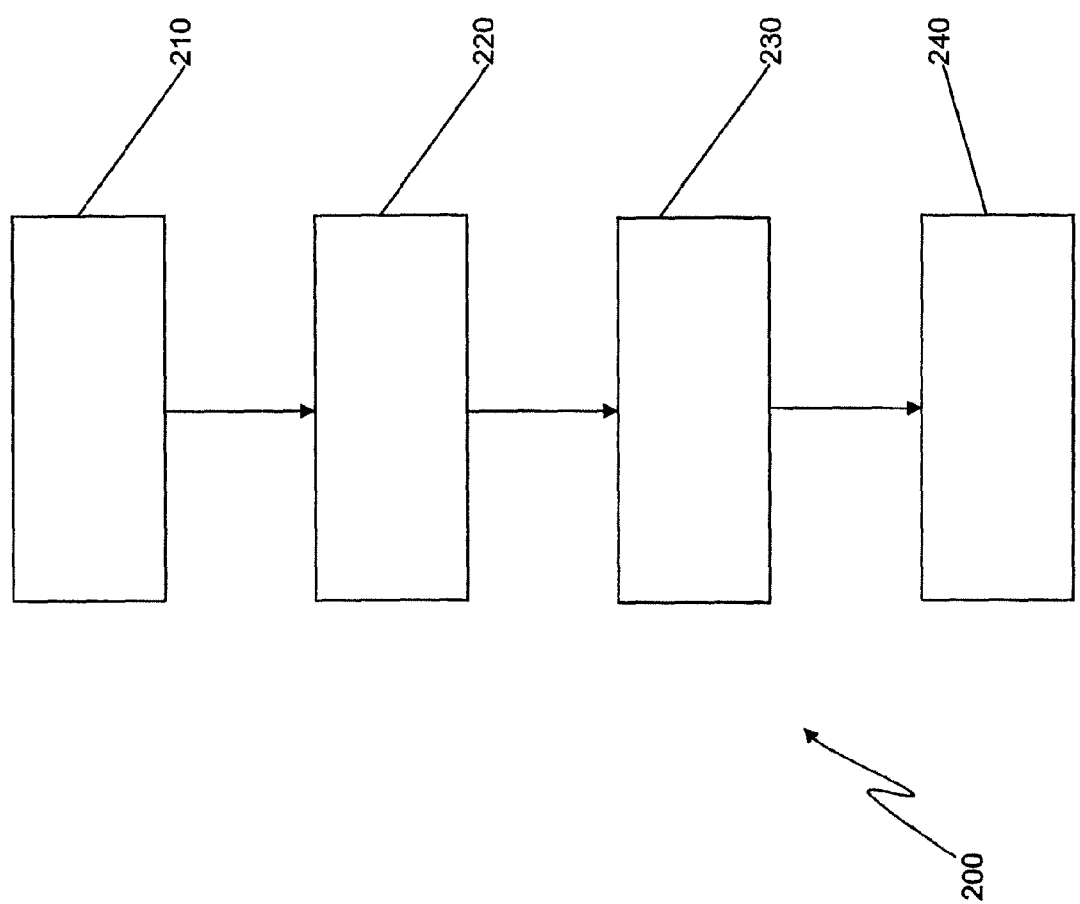

INLET AIR FILTER DEVICE FOR A POWER PLANT

FIELD OF THE INVENTION

Embodiments of the present invention relate to inlet air filter devices and to the related assembling methods, and in particular, but not exclusively, for power plants including one or more thermal machines which in operation need to be supplied with filtered air for combustion and/or ventilation purposes.

BACKGROUND ART

A power plant may include thermal machines, e.g. internal or external combustion engines, like gas turbine engines or reciprocating engines or others.

In all the above implementations the power plant includes, upstream from the thermal machine, an inlet air filtering system for removing water and/or dust and other impurities from the inlet air which, after filtration, is supplied to the thermal machine for combustion and/or ventilation purposes. The inlet-air filtering system normally comprises an upstream inlet air filter device for separating water from the inlet air and downstream filtration modules for removing dust and other impurities.

In humid weather conditions, for example rain or fog, the upstream air filter device separates water from the inlet air in order to not let droplets of water form on the downstream filtration modules, thus causing the latter to clog or, when frost conditions are reached, to ice. Filter clogging or icing may cause an excessive pressure drop in the downstream filtration modules, which can result in a significant reduction of the downstream thermal machine performance. In particular, if a thermal machine includes a compressor, which is typical in gas turbine engines, the pressure drop in the downstream filtration modules may cause such compressor to surge or security systems to stop the machine.

In dry weather conditions, on the other hand, when the inlet air does not include moisture, an upstream air filter device is useless, but also, potentially dangerous as it can itself cause undesired pressure drops. In such conditions, the air filter device should be removed or bypassed. Also in cold humid weather conditions, when ice forming on the inlet air filter device makes the pressure drop therein rise excessively, removing or bypassing the upstream inlet air filter device is required not to cause the shutdown of the downstream thermal machine, at least as long as ice does not obstruct significantly the downstream filtration modules.

In known inlet air filtering systems, the upstream air filter device is removed manually when water separation is not needed or desired. Such a solution may require the shutdown of any downstream thermal machine during the removal operations and is therefore scarcely efficient and, in addition, time demanding for field operators.

In other more efficient solutions, for example in the one described in U.S. 2011/0083419, there is provided an inlet air filtering system where the removal of the upstream water separation devices is made automatically by a remotely operated actuator. In U.S. 2011/0083419 a filter bypass assembly including a water separation filter is described. The bypass assembly is moved by an actuator between a first operating position, which intercepts the inlet air flowing in the filtering system, and a second bypass position, which lets the inlet air to reach the downstream filtering modules without crossing the water separation filter.

The latter solution is clearly an improvement over manually operated solutions, however it shows a plurality of inconveniences.

Firstly, when in the bypass position, even if the bypass assembly is not crossed by the inlet air flow, it is not isolated by any impurity which might be present in the air and therefore might deposit on or damage the water separation filter. In particular, this could occur in sandy desert environment, during sand storms.

Secondly, when in the bypass position, the bypass assembly is not isolated from the temperature and humidity conditions of the inlet air, and therefore, if the frost condition was reached causing ice to form on the water separation filter, this could be de-iced only passively, after temperature and humidity conditions of the inlet air will return above the frost point and remain in such condition for a convenient time interval. Thirdly, the bypass assembly could be improved in order to reduce its mass and simplify the cinematic elements, e.g. hinges and actuators, which are required to move the bypass assembly. Optionally, such simplification could lead to a manually operated bypass assembly.

Fourthly, also control strategies could be improved. In U.S. 2011/0083419 the bypass element is only controlled through temperature measurement. It could be envisaged to add humidity measurements in order to better operate the bypass element, following weather conditions.

SUMMARY OF THE INVENTION

An object of the present invention is to produce an inlet air filter device for a power plant which allows for efficient operation of any downstream filtration module and thermal machine in any weather and environmental condition, thus limiting shutdowns caused by the pressure drop in the air filter device or clogging in the downstream filtration modules.

According to a first embodiment and a second embodiment, the present invention accomplish the object by providing an inlet air filter device comprising at least a passage for delivering an air mass from an inlet section of the inlet air filter device to an outlet section of the inlet air filter device; a water separator in the passage for separating moisture in the air mass, the water separator being positioned between the inlet section and the outlet section of the inlet air filter device; a bypass element movable between a first open position in which the air mass is forced to cross the water separator and a second closed position in which the air mass flows from the inlet to the outlet section, without crossing the water separator, wherein the inlet air filter device further comprises a shutter element which is actuatable to co-operate with the bypass element for isolating the water separator from the air mass flowing in the passage when the bypass element is in the second closed position.

According to a further feature of the first embodiment and second embodiment, the water separator comprises a first and a second surface, the air mass flowing from the first to the second surface of the separator when crossing the water separator, the bypass element being adjacent to one of said first and second surface when the bypass element is in the closed position; the shutter element being actuatable to isolate the other of said first and second surface from the air mass when the bypass element is in the closed position.

According to a further feature of the first embodiment and second embodiment, the inlet air filter device further comprises flow means for delivering air from at least one source of air towards the water separator when the bypass element is in the second closed position and the shutter element is actuated to co-operate with the bypass element for isolating the water separator from the air mass flowing in the passage.

The water separator of the inlet air filter device of embodiments of the present invention can be physically isolated from the air mass flowing in the device when the bypass element is in the second closed position and the shutter element is operated in such a way to provide the isolation effect. This prevents any impurity which might be present in the air to deposit on or damage the water separator. Even if the isolation provided by the bypass element and the shutter element is not perfectly airtight, which could be critical in sand desert environments, the inlet air filter device of embodiments of the present invention flow means for delivering air towards the water separator when it is isolated from the air mass flowing in the passage, thus creating an over pressure with respect to the inlet air mass flow which prevents impurities to pass through the bypass element and the shutter element and to reach the water separator. If the flow means are connected to a source of hot air, for example by providing a connection with the delivery section of the compressor of a gas turbine engine, this feature of the invention can be used to de-frost and dry an iced water separator when it is in the second closed position, isolated from the air mass flowing in the device.

According to a further feature of the first embodiment, the water separator is fixed with respect to the passage and the bypass element is movable with respect to the water separator.

According to further features of the first embodiment, the water separator is spaced from an inner surface of the passage, the bypass element extending between the water separator and the inner surface of the passage when the bypass element is in the first open position, the bypass element being adjacent to the water separator when the bypass element is in the second closed position.

Splitting the bypass element from the water separator allows reducing at the minimum the mass of the bypass element, i.e. of the mass to be moved in the inlet air filter device. A smaller and lighter bypass element can be moved by a smaller electric or hydraulic actuator, consuming a lower amount of energy, or by a manually operated actuator, thus allowing in all cases a reduction of costs.

A further object of embodiments of the present invention is to develop a method for assembling an inlet air filter device.

According to a third embodiment and a fourth embodiment, the present invention accomplish the same objects and provides the same features described with reference to the first and second embodiment by providing an inlet air filter device comprising one single passage for delivering an air mass from an inlet section of the inlet air filter device.

According to a fifth embodiment, the present invention accomplishes this further object by providing a method for assembling an inlet air filter device comprising: a first step of providing a passage in the inlet air filter device in such a way that a flow path for an air mass is defined from an inlet section of the inlet air filter device to an outlet section of the inlet air filter device; a second step of providing a water separator in the passage for separating humidity in the air mass, the water separator being positioned between the inlet section and the outlet section of the inlet air filter device; a third step of providing a bypass element movable from a first open position in which the air mass is forced to cross the water separator and a second closed position in which the air mass flows from the inlet to the outlet section without crossing the water separator, and a fourth step of providing a shutter element arranged in such a way to be actuatable to co-operate with the bypass element for isolating the water separator from the air mass flowing in the passage when the bypass element is in the second closed position.

The same advantages described above with reference to the other embodiments of the present invention are accomplished by the fifth embodiment.

BRIEF DESCRIPTION OF THE DRAWINGS

Other object feature and advantages of the present invention will become evident from the following description of the embodiments of the invention taken in conjunction with the following drawings, wherein:

FIG. 1 is a schematic view of an inlet filtering system for a power plant according to an embodiment of the present invention;

FIG. 2 is a schematic cross-sectional view showing a first embodiment of an inlet air filter device according to the present invention;

FIGS. 3 and 4 are schematic cross-sectional views of the inlet air filter device in FIG. 2, in respective different operational configurations;

FIGS. 7 and 8 are schematic cross-sectional views, corresponding to FIG. 2, showing, respectively, a third and a fourth embodiment of an inlet air filter device according to the present invention;

FIGS. 9 and 10 are schematic cross-sectional views of the embodiments in FIGS. 3-4 and 5-6, respectively, showing further components of the inlet air filter device according to embodiments of the present invention;

FIG. 11 is flow chart diagram of a method for assembling an inlet air filter device according to an embodiment of the present invention.

DETAILED DESCRIPTION OF THE INVENTION

Figure 6:
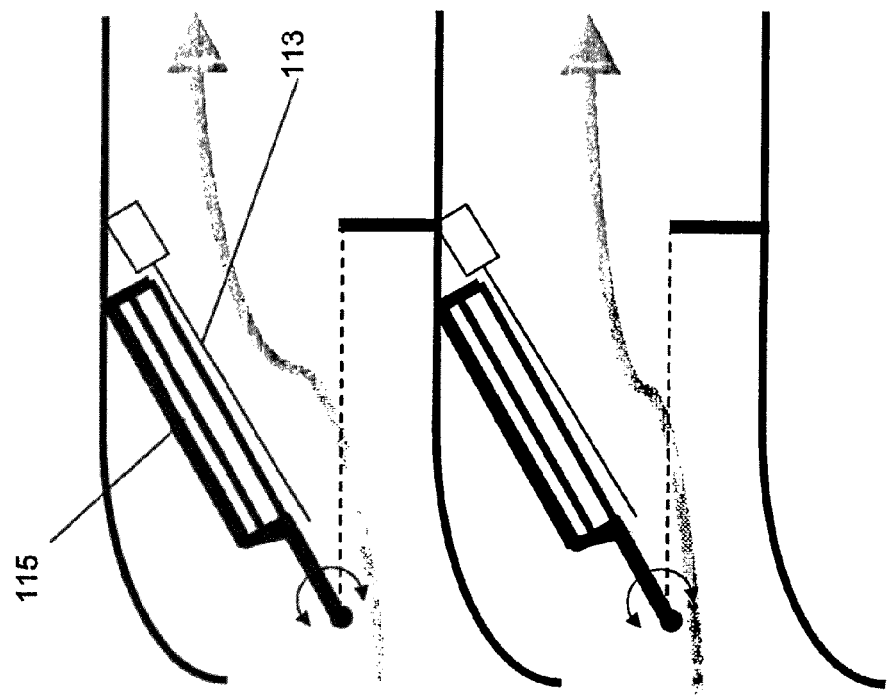
FIGS. 5 and 6 are schematic cross-sectional views, corresponding to FIGS. 3 and 4, of a second alternative embodiment of a an inlet air filter device according to the present invention.

With reference to FIG. 1, a power plant 100 comprises an inlet air filtering system 110 for removing water and impurities, for example dust or sand, from a mass of air 4 entering the plant 100. The air filtering system 110 extends from a suction section 110a to a delivery section 110b and comprises an upstream inlet air filter device 1 for removing water from the mass of air 4 entering the filtering system 110 and plurality of downstream filtering modules 111 for removing solid impurities from the mass of air 4 flowing from the upstream inlet air filter device 1.

The inlet air filter device 1 includes a plurality of weather hoods 102a-c (three weather hoods shown in FIG. 1), for protecting the suction section 110a from weather agents, and a first upstream portion 103a of a filter house 103, adjacent to the weather hoods 102a, b, c. The downstream filtering modules 111 are housed in a second downstream portion 103b of the filter house 103, the second portion 103b extending from the first portion 103a to the delivery section 110b of the air filtering system 110. The downstream filtering modules 111 are of known types and can be arranged in a plurality of configurations, depending on the specific requirements of the power plant 100. For example the filtering modules 111 may include pulse jet filters and/or HEPA filters. Generally, filtering modules 111 are subject to clogging by mixtures of water droplets and solid impurities and for this reason they need to be coupled to the upstream inlet air filter device 1. However, filtering modules 111 are not an object of the present invention and therefore are not described in further detail.

The mass of air 4, after treatment in the filtering system 110 is delivered to a thermal machine 130, through an inlet duct 120, connecting the filtering system 110 with the thermal machine 130.

The thermal machine 130 can be of various types, all requiring to be supplied with air free of solid impurities and therefore all requiring to be proceeded by a filtering system including at least the filtering modules 111. For example, in an embodiment of the power plant 100, the thermal machine 130 is a reciprocating engine. In another embodiment of the power plant 100, the thermal machine 130 is a gas turbine engine including an upstream air compressor, a downstream turbine and a combustor between them.

A first embodiment of the inlet air filter device 1 is shown in more detail in FIGS. 2, 3, and 4. With reference to FIGS. 2-4, the filter device 1 comprises a plurality of passages 3 (only two passages 3 are shown for clarity reasons) for delivering the air mass 4 from an inlet section 5 of the inlet air filter device 1 to an outlet section 6 of the inlet air filter device 1. The inlet section 5 is coincident with the suction section 110a of the filtering system 110 and the outlet section 6 separates the first and second portion 103a,b of the filter house 103. The passages 3 comprises respective first portions 3a delimited by the weather hoods 102a, b, c and respective second portions 3b extending in the first upstream portion 103a of the filter house 103. The passages 3, in both the first and the second portion 3a,b, is delimited by inner surfaces 3c which define a flow path for the mass of air 4 flowing from the inlet section 5 to the outlet section 6.

The filter device 1 comprises a water separator 10 in each passage 3 for separating water in the air mass 4. The water separator 10 is fixed with respect to the passage 3 and is positioned between the inlet section 5 and the outlet section 6, in such a way to intercept the flow path of the mass of air 4 flowing in the passage 3 from the inlet section 5 to the outlet section 6. In particular, the water separator 10 is positioned in the passage 3 between the first and the second portion 3a,b thereof. The water separator 10 is spaced from the inner surface 3c of the passage 3.

The water separator 10 comprises a first free surface 20 and a second free surface 21 and is oriented in such a way that the first and second surface are respectively upstream and downstream with respect to the flow path of the mass of air 4. Each of the first and a second surface 20, 21 comprises an upstream edge 20a, 21a and a downstream edge 20b, 21b, respectively oriented towards the inlet section 5 and the outlet section 6. The water separator 10 comprises a droplet catcher 11 and a coalescer 12, oriented in such a way that the droplet catcher 11 is adjacent to the first upstream surface 20 and the coalescer 12 is adjacent to the second downstream surface 21. Alternatively, according to another embodiment of the present invention (not shown) the water separator includes only the droplet catcher. In general, for the purposes of embodiments of the present invention, a water separator of any type is usable provided that it is positioned in the passage 3, between the inlet section 5 and the outlet section 6, for separating water in the air mass 4.

In the passage 3a fixed wall 30 is provided extending between the downstream edges 20b, 21b and the inner surfaces 3c of the passages. The fixed wall 30 intercepts the flow path of the mass of air 4, which is forced to deviate towards the first surface 20 of the water separator.

The filter device 1 further comprises a pressure sensor 23 between one side and the other of the fixed wall 30, i.e. between the first and the second portion 3a,b of the passage, to measure the pressure drop across the water separator 10.

The filter device 1 further comprises a wall-shaped bypass element 15, which is movable, with respect to the water separator 10 and to the passage 3, between a first open position (FIG. 2) in which the air mass is forced to cross the water separator 10, flowing from the first to the second surface 20, 21, and a second closed position in which the air mass 4 flows from the inlet 5 to the outlet section 6, without crossing the water separator 10. In the first position, the air mass 4 crossing the water separator 10 first passes through the droplet catcher 11 and then through the coalescer 12. The filter device 1 includes a hinge 18 on the upstream edge 21a of the second free surface 21 of the water separator 10, around which the bypass element 15 rotates for moving between the first and the second position. The rotation of the bypass element 15 around the hinge 18 is actuated through an electric actuator 16. Alternatively, according to another embodiment of the invention (not shown) the bypass element 15 is actuated manually or by a pneumatic actuator.

When the bypass element 15 is in the first open position, the bypass element 15 extends between the hinge 18 on the water separator 10 and the inner surface 3c of the passage 3, in the opposite direction with respect to the fixed wall 30. In the first open position, the bypass element 15 intercepts the flow path of the mass of air 4, thus co-operating with the fixed wall 30 in deviating the mass of air 4 towards the first surface 20 of the water separator.

In the second closed position, the bypass element 15 is adjacent to the second surface 21 of the water separator 10 and spaced from the inner surfaces 3c of the passage 3. The passage 3 results intercepted at the first surface 20 when the bypass element 15 is in the closed position.

The inlet air filter device 1 further comprises a shutter element 13 which is actuatable to co-operate with the bypass element 15 for isolating the water separator 10 from the air mass 4 flowing in the passage 3 when the bypass element 15 is in the second closed position.

The shutter element 13 comprises a plurality of blades 14 actuated through a second electric actuator 17 to close in such a way (FIG. 4) to isolate the first surface 20 from the air mass 4 when the bypass element 15 is in the closed position.

Alternatively, according to another embodiment of the invention (not shown) the shutter element 13 is actuated manually or by a pneumatic actuator. Seal means are provided between the bypass element 15 and the water separator 10 and between the shutter element 13 and the water separator 10 for assuring airtightness when the water separator 10 is isolated from the air mass 4 flowing in the passage 3. Seal means are also provided between the bypass element 15 and the inner surfaces 3c of the passage 3 for assuring airtightness between them when the bypass element 15 is in the open position.

Figure 5:
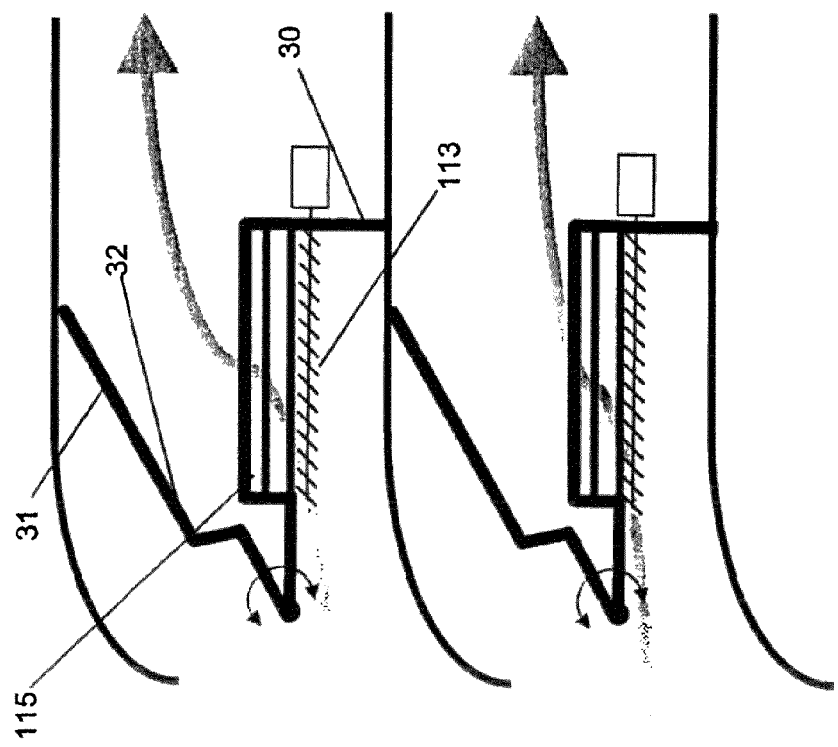

A second embodiment of the inlet air filter device 1 is shown in more detail in FIGS. 5-6, identical components illustrated in FIGS. 5-6 are labelled with the same reference numbers used in FIG. 1-4.

In the embodiment of FIG. 5-6, a second fixed wall 31 extends between the upstream edge 21a, b of the second surface 21 and the inner surface 3c of the passage 3, in opposite direction with respect to the fixed wall 30. The first and second walls 30, 31 co-operates together for intercepting the flow path of the mass of air 4, which is forced to pass between the first and second walls 30, 31, where the water separator 10 is placed, as explained below.

In the embodiment of FIG. 5-6, the water separator 10 is integral with a bypass element 115 and moves together with it between the first open position (FIG. 5) and the second closed position (FIG. 6).

In the first open position, the bypass element 115, including the water separator 10, is remote from the inner surfaces 3c of the passage 3, in a position substantially identical to the position of the water separator 10 in the embodiments of FIGS. 2-4. In the second closed position, the bypass element 115 occupies a seat 32 in the second fixed wall 31 and is close to the inner surfaces 3c of the passage 3, in a position substantially identical to the position of the bypass element 15 in the embodiments of FIGS. 2-4. In the embodiments of FIG. 5-6, a shutter element 113 is included for co-operating with the bypass element 115 for isolating the water separator 10 from the air mass 4 flowing in the passage 3 when the bypass element 115 is in the second closed position. The shutter element 113 is functionally and structurally equivalent to the shutter element 13 of the first embodiment. The shutter element 113 is fixed to the bypass element 115 and moves together with it between the first and the second position. The shutter element 113 comprises a plurality of blades 114 actuated through the electric actuator 17 to close in such a way (FIG. 6) as to isolate the first surface 20 of the water separator 10 from the air mass 4 when the bypass element 15 is in the closed position.

Seal means are provided between the shutter element 113 and the water separator 10 for assuring airtightness when the blades 114 are actuated to isolate the water separator 10 from the air mass 4 flowing in the passage 3. In the embodiments described above, the bypass element 15, 115 is moved between the first and the second position according to actuation strategies, depending on weather and environmental conditions. To operate such strategies the characteristics of the air entering the inlet air filter device have to be measured. As shown schematically in FIG. 1, the power plant 1 includes five sensors 121a-e to respectively measure wind direction, wind intensity, relative humidity, temperature, and opacity. Measured data are sent to the PLC control system 122, which controls also the thermal machine 130. According to a different embodiment of the invention a dedicated PLC control system is used. The control system 122 elaborates the data measured by the sensors 121a-e and command the actuator 16, through an electrical connection 123, for moving the bypass element 15, 115 according to predefined actuation strategies.

In an embodiment of the invention, mentioned above, where the bypass element 15, 115 is manually actuated, the control system 122 elaborates the data measured by the sensors 121a-e and shows the operator the action to be done on the bypass element 15, 115 according to predefined actuation strategies.

In a first actuation strategy, the wind direction and intensity together with relative humidity and opacity of the air are measured to determine a sand storm condition for a power plant installed on a coastal region close to a sand desert. Wind direction data are used to determine if the air is coming from the sea, i.e. without sand therein, or from the inland, i.e. potentially with sand therein. Wind intensity data are used to determine stormy conditions. Also very low relative humidity and high opacity help to determines stormy conditions. In such a condition, the actuation strategy requires the bypass element 15, 115 to be moved to the second closed position and to isolate it with the shutter element 13, 113.

In a second actuation strategy, relative humidity and temperature are measured to determine frost point conditions. In such conditions, the actuation strategy requires the bypass element 15, 115 be left in the first open position until ice formed on the water separator 10 causes the pressure drop measured by the pressure sensor 23 to rise to unacceptable values. When the pressure drop measured by the pressure sensor 23 is above a predefined threshold value, the bypass element 15, 115 is moved to the second closed position at least until de-frosting and drying of water separator 10 is achieved.

Other actuation strategies can be applied according to specific requirements of the power plant 100 and, in particular, of the thermal machine 130.

In both the first and the second embodiment described above, the inlet air filter device 1 further comprises flow means 25 for delivering air from at least one source of air towards the water separator 10 when the bypass element 15, 115 is in the second closed position and the shutter element 13, 113 is actuated to co-operate with the bypass element 15, 115 for isolating the water separator 10 from the air mass 4 flowing in the passage 3. When the source of air is a source of hot air, flow means 25 can be used to achieve de-frosting and drying the water separator 10 in a quick and efficient manner. In addition, flow means 25 can be used to create an over pressure in the water separator 10 with respect to the inlet flow of the mass of air 4, when the water separator 10 is in the second closed position and physically isolated from the inlet air mass 4. Such an over pressure prevents impurities to pass through the bypass element 15, 115 and/or the shutter element 13, 113, thus reaching the water separator 10. In all cases, the source of air is can be a source of clean air, in order not to dirty (i.e., soil) the water separator 10.

A third embodiment of the inlet air filter device 1 is shown in more detail in FIG. 7. Identical components illustrated in FIG. 7 are labelled with the same reference numbers used in FIG. 1-6.

The third embodiment differs from the first embodiment for the fact that in the former the filter device 1 comprises a single passage 3 for delivering the air mass 4 from an inlet section 5 of the inlet air filter device 1 to an outlet section 6 of the inlet air filter device 1.

The filter device 1 comprises two water separators 10a, b, respectively upper and lower, in the single passage 3 for separating water in the air mass 4.

When in the first open position, the wall-shaped bypass element 15 of the upper water separator 10a extends between the respective hinge 18 on the water separator 10a and the inner surface 3c of the passage 3, as in the first embodiment in FIGS. 2-4. Differently from the first embodiment in FIGS. 2-4, the bypass element 15 of the lower water separator 10b extends between the respective hinge 18 on the water separator 10b and the downstream edge 20b of the first surface 20 of the upper water separator 10a. Seal means are provided on the downstream edge 20b and/or on the bypass element 15 of the water separator 10b for assuring airtightness between such components when the bypass element 15 of the water separator 10b is in the open position. According to the third embodiment in FIG. 7, a single weather hood 102a is provided inlet air filter device 1 for protecting the suction section 110a from weather agents. An additional hood 102d departing from the upstream edge 20a of the first surface 20 of each water separator 10a, b may be provided in case of acoustical requirement.

A fourth embodiment of the inlet air filter device 1 is shown in more detail in FIG. 8. Identical components illustrated in FIG. 8 are labelled with the same reference numbers used in FIG. 1-7.

The fourth embodiment differs from the third embodiment in FIG. 7 for the fact that, instead of the shutter element 13, a second wall-shaped element 213 is used for isolating each water separator 10a, b from the air mass 4 flowing in the single passage 3 when the bypass element 15 is in the second closed position. Each second wall-shaped element 213 is hinged to the downstream edge 20b of the first surface 20 of each water separator 10a, b, respectively, in order to be rotatable from a first open position, remote from the first surface 20, and a second closed position, adjacent to the first surface 20. The bypass element 15 of the lower water separator 10b and the second wall-shaped element 213 of the upper water separator 10a are adjacent to each other when they are both in the open position, shown in FIG. 8. Seal means are provided on the second wall-shaped element 213 and/or on the bypass element 15 for assuring airtightness between them when they are adjacent to each other in the open position. According to other embodiments (not shown) structurally and functionally similar to the third and fourth embodiment, a different number of water separators 10 (one or three or more water separators 10) are used in the single passage 3.

Figure 10:
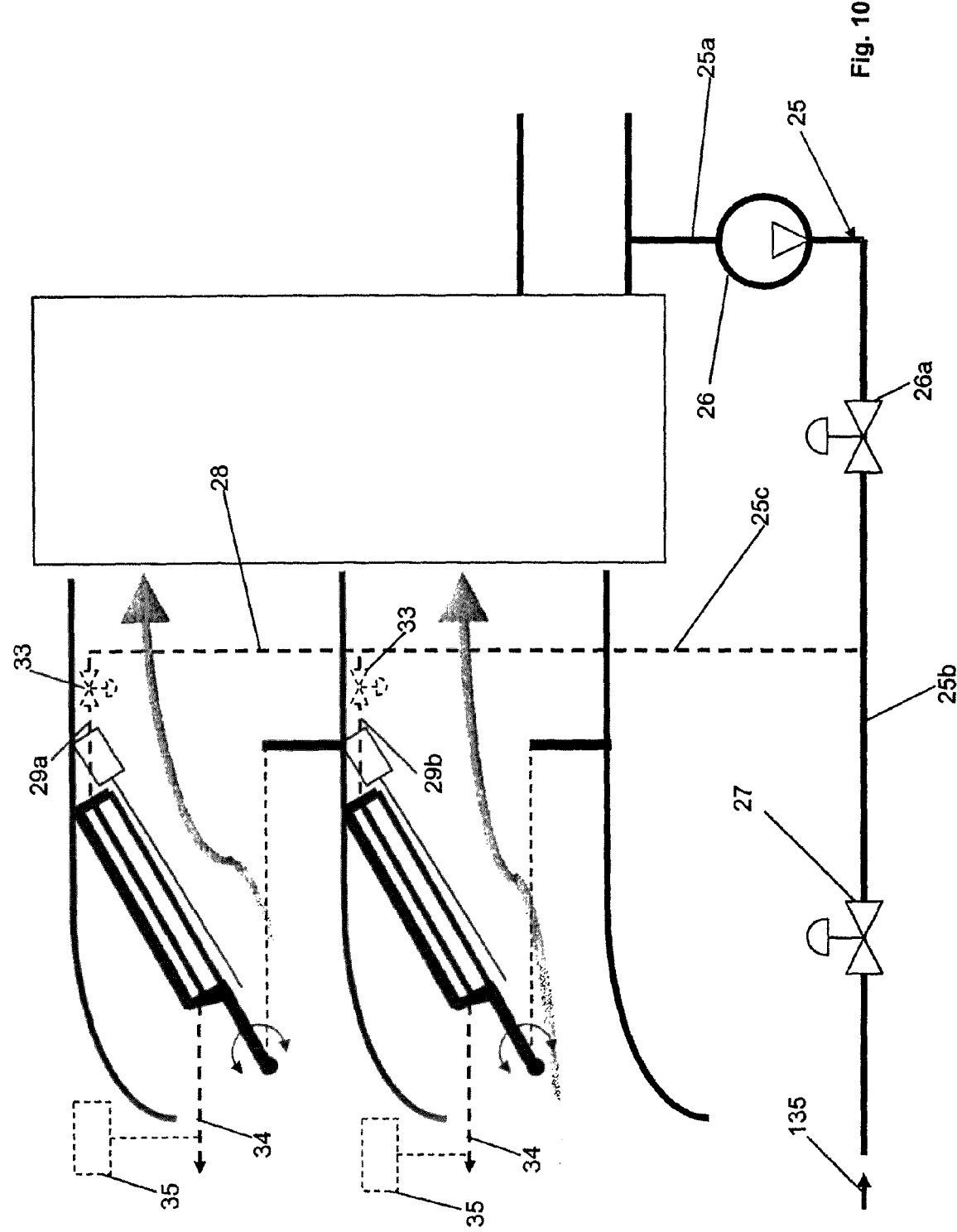

With reference to FIGS. 9 and 10, which respectively refer to the first and the second embodiment, flow means 25 comprise a plurality of pipe branches, including a first branch 25a extending from the inlet duct 120 towards the water separator 10 and a second branch 25b extending from a source of hot air 135 towards the water separator 10. When the thermal engine 130 is a gas turbine engine the source of hot air 135 is normally the delivery section of the source of hot air 135. The first branch 25a includes a pump 26 for delivering air from the inlet duct 130 the water separator 10 and a control valve 26a, immediately downstream the pump 26. The second branch 25b includes intercepting means 27, for example a control valve, for controlling the flow of hot air from the source 135 to the water separator 10. Flow means 25 further comprise a third branch 25c for connecting both the first an second branches 25a, b to each water separator 10 of the inlet air filter device 1. The third branch 25c comprises a main pipe 28 and secondary pipes 29a, 29b departing from the main pipe 28, each of the secondary pipes 29a-b being connected with a respective water separator 10 (two secondary pipes 29a-b in FIG. 7-8 for clarity reasons). In each secondary pipe 29a-b, respective intercepting means 33, for example a control valve, are provided for controlling the flow of air in each of the secondary pipes 29a-b, independently from the others. In the first embodiment of the air inlet filter device 1, each secondary pipe 29a-b is directly connected to the respective water separator 10 (FIG. 9). In the second embodiment of the air inlet filter device 1, each secondary pipe 29a-b is connected to the respective seat 32 occupied by water separator 10 when in the respective second closed position (FIG. 10). The air delivered through secondary pipes 29a-b crosses the respective water separator 10 and is finally delivered to the atmosphere through a respective downstream pipe 34. In each downstream pipe 34, a relative humidity sensor 35 is provided for controlling the intercepting means 33 in at least one operative configuration. For example the humidity sensor 35 can identify a dry condition of the water separator 10 when the latter is connected to the source 135 for de-frosting and drying. When such dry condition is reached hot air is no longer required in the water separator 10 and the respective control valve 33 can be activated for isolating the respective secondary pipe 29a-b.

The components described in FIGS. 9 and 10 can be easily adapted also to the third and fourth embodiment in FIGS. 7 and 8.

In a further embodiment of the present invention (not shown), water flow means are provided for connecting each water separator 10 to a source of water. This is particularly useful in desert environments, where the water separator 10, when it is isolated from the air mass 4 flowing in the passage 3, can be washed by injecting water through such water flow means.

In this way maintenance operations on the water separator 10 will be strongly reduced.

In a fifth embodiment of the present invention, diagrammatically represented in FIG. 11, a method 200 for assembling an inlet air filter device 1 comprises four main steps 210, 220, 230, 240.

In a first step 210, a passage 3 is provided in the inlet air filter device 1 in such a way that a flow path for an air mass 4 is defined from an inlet section 5 of the inlet air filter device 1 to an outlet section 6 of the inlet air filter device 1.

In a second step 220, a water separator 10 is provided in the passage 3 for separating humidity in the air mass 4, the water separator 10 being positioned between the inlet section 5 and the outlet section 6 of the inlet air filter device 1.

In a third step 230, a bypass element 15, 115 is provided. The bypass element 15, 115 is movable from a first open position in which the air mass 4 is forced to cross the water separator 10 and a second closed position in which the air mass 4 flows from the inlet 5 to the outlet section 6 without crossing the water separator 10.

In a fourth step 240, a shutter element 13, 113 is provided and arranged in such a way to be actuatable to co-operate with the bypass element 15, 115 for isolating the water separator 10 from the air mass 4 flowing in the passage 3 when the bypass element 15, 115 is in the second closed position.

In a fifth optional step, flow means 25 are provided for delivering air from at least one source of air towards the water separator 10 when the bypass element 15, 115 is in the second closed position and the shutter element 13, 113 is actuated to co-operate with the bypass element 15, 115 for isolating the water separator 10 from the air mass 4 flowing in the passage 3.

The present invention allows accomplishing the object and advantages described above. In addition, the method described above can be used in refurbishing a conventional inlet air filtering system, by including therein, an inlet air filter device according to an embodiment of the present invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements with insubstantial differences from the literal languages of the claims.

What is claimed is:

1. An inlet air filter device, the device comprising:
   at least one passage for delivering an air mass from an inlet section of the inlet air filter device to an outlet section of the inlet air filter device,
   a water separator in the at least one passage for separating water in the air mass, the water separator positioned between the inlet section and the outlet section of the inlet air filter device, and comprising a first surface upstream of a flow path of the air mass and a second surface downstream of the flow path of the air mass,
   a bypass element movable between a first open position in which the air mass is forced to cross the water separator and a second closed position in which the air mass flows from the inlet to the outlet section without crossing the water separator,
   a shutter element fixed to the bypass element and actuatable for isolating the first surface from the air mass flowing in the passage when the bypass element is in the second closed position.

2. The inlet air filter device according to claim 1, wherein the air mass flows from the first surface to the second surface of the water separator when crossing the water separator, and the passage is intercepted at the second surface when the bypass element is in the closed position.

3. The inlet air filter device according to claim 1, wherein the air filter device includes a hinge around which the bypass element rotates for moving between the first and the second position.

4. The inlet air filter device according to claim 3, wherein the passage is delimited by at least one inner surface, one of the first open position or second closed position of the bypass element is spaced from the inner surface of the passage, the other of the first open position or second closed position of the bypass element being is adjacent to the inner surface of the passage.

5. The inlet air filter device according to claim 1, wherein the water separator is fixed with respect to the passage and the bypass element is movable with respect to the water separator.

6. The inlet air filter device according to claim 5, wherein the water separator is spaced from an inner surface of the passage, the bypass element extending between the water separator and the inner surface of the passage when the bypass element is in the first open position, the bypass element being adjacent to the water separator when the bypass element is in the second closed position.

7. The inlet air filter device according to claim 1, wherein the water separator is integral with the bypass element.

8. The inlet air filter device according to claim 7, wherein the bypass element in the first open position is remote from an inner surface of the passage, and the bypass element is close to the inner surface of the passage when the bypass element is in the second closed position.

9. The inlet air filter device according to claim 1, wherein the bypass element is wall shaped.

10. The inlet air filter device according to claim 1, wherein the water separator comprises a droplet catcher and a coalescer, the water separator being oriented in the passage in such a way that the air mass crossing the water separator first passes through the droplet catcher and then through the coalescer.

11. The inlet air filter device according to claim 1, wherein the inlet air filter device further comprises a flow device for delivering air from at least one source of air towards the water separator when the bypass element is in the second closed position and the shutter element is actuated to co-operate with the bypass element for isolating the water separator from the air mass flowing in the passage.

12. An inlet air filtering system for a power plant, the inlet air filtering system comprising:
   an inlet air filter device comprising:
   at least one passage for delivering an air mass from an inlet section of the inlet air filter device to an outlet section of the inlet air filter device,
   a water separator in the at least one passage for separating water in the air mass, the water separator positioned between the inlet section and the outlet section of the inlet air filter device, and comprising a first surface upstream of a flow path of the air mass and a second surface downstream of the flow path of the air mass,
   a bypass element movable between a first open position in which the air mass is forced to cross the water separator and a second closed position in which the air mass flows from the inlet to the outlet section without crossing the water separator,
   a shutter element fixed to the bypass element and actuatable for isolating the first surface from the air mass flowing in the passage when the bypass element is in the second closed position.

13. A method for assembling an inlet air filter device, the method comprising:
   providing a passage in the inlet air filter device in such a way that a flow path for an air mass is defined from an inlet section of the inlet air filter device to an outlet section of the inlet air filter device,
   providing a water separator in the passage for separating humidity in the air mass, the water separator positioned between the inlet section and the outlet section of the inlet air filter device, and comprising a first surface upstream of a flow path of the air mass and a second surface downstream of the flow path of the air mass,
   providing a bypass element movable from a first open position in which the air mass is forced to cross the water separator and a second closed position in which the air mass flows from the inlet to the outlet section without crossing the water separator,
   providing a shutter element fixed to the bypass element and arranged in such a way to be actuatable for isolating the separator first surface from the air mass flowing in the passage when the bypass element is in the second closed position.

14. The inlet air filtering system of claim 12, wherein the air mass flows from the first surface to the second surface of the water separator when crossing the water separator, and the passage is intercepted at the second surface when the bypass element is in the closed position.

15. The inlet air filtering system of claim 12, wherein the air filter device includes a hinge around which the bypass element rotates for moving between the first and the second position.

16. The inlet air filtering system of claim 12, wherein the water separator is fixed with respect to the passage and the bypass element is movable with respect to the water separator.

17. The inlet air filtering system of claim 12, wherein the water separator is integral with the bypass element.

18. The inlet air filtering system of claim 12, wherein the bypass element is wall shaped.

19. The inlet air filtering system of claim 12, wherein the water separator comprises a droplet catcher and a coalescer, the water separator being oriented in the passage in such a way that the air mass crossing the water separator first passes through the droplet catcher and then through the coalescer.

20. The shutter element of claim 1, comprising a plurality of blades actuated to close to isolate the first surface from the air mass.

* * * * *